United States Patent
Alfadhly et al.

(10) Patent No.: US 9,146,820 B2
(45) Date of Patent: Sep. 29, 2015

(54) WSAN SIMULTANEOUS FAILURES RECOVERY METHOD

(71) Applicant: KING FAHD UNIVERSITY OF PETROLEUM AND MINERALS, Dhahran (SA)

(72) Inventors: Abdullah Alfadhly, Riyadh (SA); Uthman Baroudi, Dhahran (SA); Mohamed Farag Younis, Ellicott City, MD (US)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 157 days.

(21) Appl. No.: 13/873,101

(22) Filed: Apr. 29, 2013

(65) Prior Publication Data
US 2014/0325257 A1    Oct. 30, 2014

(51) Int. Cl.
*G06F 11/00* (2006.01)
*G06F 11/20* (2006.01)

(52) U.S. Cl.
CPC .................................. *G06F 11/2002* (2013.01)

(58) Field of Classification Search
CPC ............. H04L 12/437; H04L 12/2422; H04L 41/0654; H04L 29/14; G06F 11/3006; G06F 11/20–11/2012
See application file for complete search history.

(56) References Cited

U.S. PATENT DOCUMENTS

| | | | | |
|---|---|---|---|---|
| 6,130,875 | A  * | 10/2000 | Doshi et al. | 370/225 |
| 7,839,764 | B2 | 11/2010 | Jiang et al. | |
| 2004/0030448 | A1 | 2/2004 | Solomon | |
| 2008/0130491 | A1 * | 6/2008 | Chao et al. | 370/225 |
| 2009/0113232 | A1 * | 4/2009 | Park et al. | 714/2 |
| 2009/0252032 | A1 * | 10/2009 | Jiang et al. | 370/217 |

OTHER PUBLICATIONS

K. Akkaya, F. Senel, A. Thimmapuram and S. Uludag, "Distributed Recovery from Network Partitioning in Movable Sensor/Actor Networks via Controlled Mobility", Computers, IEEE Transactions on, vol. 59, Issue 2, pp. 258-271, Feb. 2010.
S. Lee and M. Younis, "Recovery from multiple simultaneous failures in wireless sensor networks using minimum Steiner tree", Journal of Parallel and Distributed Computing, vol. 70, Issue 5, May 2010, pp. 525-536.

* cited by examiner

*Primary Examiner* — Jason Bryan
(74) *Attorney, Agent, or Firm* — Richard C Litman (57) ABSTRACT

The WSAN simultaneous failures recovery method ranks each node based on the number of hops to a pre-designated root node in the network. The method identifies some nodes as cluster heads based on the number of their children in the recovery tree. The method assigns a recovery weight and a nearby cluster node to each node. Nearby cluster nodes serve as gateways to other nodes that belong to that cluster. The recovery weight is used to decide which node is better to move in order to achieve lower recovery cost. The recovery method uses the same on-going set of actors to restore connectivity. Simulation results have demonstrated that the recovery method can achieve low recovery cost per failed node in small and large networks. The results have also shown that clustering leads to lower recovery cost if the sub-network needs to re-establish links with the rest of the network.

3 Claims, 7 Drawing Sheets

→ Cluster Identification Message
--→ Weight Computing Message

| Node | cw | rw | Cluster |
|---|---|---|---|
| c | 3 | 1 | c |
| e | 0 | 0 | c |
| f | 0 | 0 | c |
| g | 0 | 2 | c |
| i | 3 | 1 | i |
| j | 1 | 1 | i |
| k | 0 | 0 | i |
| m | 0 | 0 | i |

WSAN SIMULTANEOUS FAILURES RECOVERY METHOD

BACKGROUND OF THE INVENTION

1. Field of the Invention

The present invention relates to a wireless sensor-actor network (WSAN), and particularly to a WSAN simultaneous failures recovery method.

2. Description of the Related Art

Wireless Sensor and Actor Networks (WSANs) have attracted a lot of interest in recent years. Their potential applications include search-and-rescue, forest fire detection and containment, battlefield reconnaissance, under-water surveillance, etc. In a WSAN, the area of interest is densely-populated with miniaturized battery-operated sensor nodes that are to probe their surroundings and send the collected data to more capable actor nodes for processing and putting forward an appropriate response.

For example, sensors can detect rising temperatures in some spots in a forest and inform mobile robots (actors) that correlate the sensors reports and conclude that the rising temperatures are caused by the outbreak of a fire. The robots would then coordinate among themselves to plan a response that may include moving to the affected location and spraying chemicals to extinguish the fire. Given the collaborative nature of the WSAN operation, inter-actor connectivity is essential. Obviously, coordination among actors cannot be performed in a partitioned network topology. Therefore, actors strive to sustain communication links among each other when they move.

However, the failure of one or multiple actors may partition the network into disjoint sub-networks. This may happen while responding to a harsh event, e.g., a fire, and would require a rapid recovery so that the event would not get out of hand and lead to disastrous consequences. Since WSANs operate unattended and the deployment of spare actors may take time, the recovery should be performed through network self-reconfiguration using existing resources. Recently, this problem has received a lot of attention, and multiple recovery solutions are proposed. However, these approaches are restricted to one failure at a time and do not handle simultaneous failures.

Thus, a WSAN simultaneous failures recovery method solving the aforementioned problems is desired.

SUMMARY OF THE INVENTION

The WSAN simultaneous failures recovery method pursues combined proactive and reactive strategies by creating a recovery tree from the original network. The simultaneous failures recovery method assumes a node is pre-assigned as a root node at the time of the network deployment. A breadth first search tree is constructed, and the level of the individual nodes is used for defining their role in the recovery. After a failure, one of the children of the failed parent in the recovery tree moves to the position of its parent and becomes a leader of other nodes in the sub-network in order to establish its connectivity with the rest of the network. To lower the travel overhead, each node is assigned a recovery weight based on the number of hops to its closest leaf node in the recovery tree. Moreover, to enable the connectivity of the network, some nodes are chosen to be clusters during the ranking phase. These nodes serve as gateways to nearby nodes. The leader of a disconnected sub-network moves to its cluster if it is still not connected after recovering its parent.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The WSAN simultaneous failures recovery method provides for construction of a breadth first search tree. The level of the individual nodes is used for defining their role in the recovery. After a failure, one of the children of the failed parent in the recovery tree moves to the position of its parent and becomes a leader of other nodes in the sub-network in order to establish its connectivity with the rest of the network. To lower the travel overhead, each node is assigned a recovery weight based on the number of hops to its closest leaf node in the recovery tree. Moreover, to enable the connectivity of the network, some nodes are chosen to be clusters during the ranking phase. These nodes serve as gateways to nearby nodes. The leader of a disconnected sub-network moves to its cluster if it is still not connected after recovering its parent. The present WSAN simultaneous failures recovery method is executed by computer-implemented algorithms in the form of computer readable instructions stored on non-transitory media, such as computer Read Only Memory (ROM), computer disk, computer hard drive, FLASH memory, EEPROM memory, and the like, and is utilized in the wireless sensor actor network (WSAN) to maintain and restore connectivity following multiple network node failures.

After deployment, nodes gather the information needed to work in a coordinated manner in restoring connectivity after failure. In the present method, it is assumed that one of the nodes is pre-assigned as a root of the network. Immediately after the deployment, the root initiates a rank assignment phase. The purpose of this phase is to assign a rank to each node and construct a recovery tree. The recovery tree is used to coordinate connectivity restoration. The rank assignment is used to calculate a weight that determines the scope of node's participation in the recovery.

The rank of a node is the number of shortest hops to the root (R) of the network. In case of a root R, rank(R)=0 and ranker (R)=R, where ranker is the node that assigns the rank. Once the network nodes are deployed and the network is ready for operation, the root "R" of the network runs a breadth first search to assign ranks to the individual nodes by sending a message to its neighbours, which forwards the message to their reachable nodes, and so on. The rank assignment message contains its ID, its rank, and the ID of the ranker (i, rank(i),ranker(i)). For example, let us assume that a node j receives this message from a node i. The following is executed by node j in order to compute rank(j) and ranker(j):

TABLE 1

Rank Assignment Algorithm

Figure 1A:
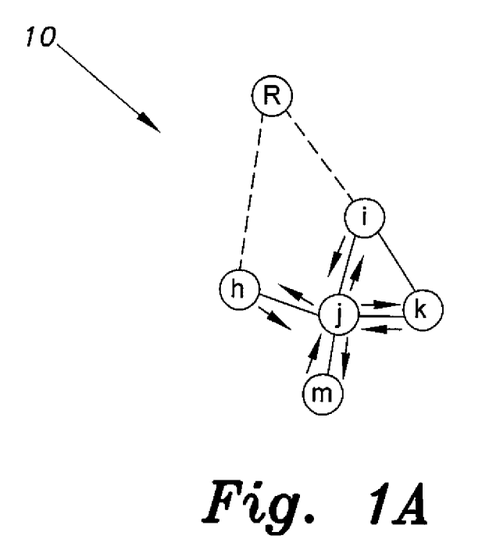
FIG. 1A is a node diagram illustrating the rank assignment phase in a WSAN simultaneous failures recovery method according to the present invention.
Figure 1B:
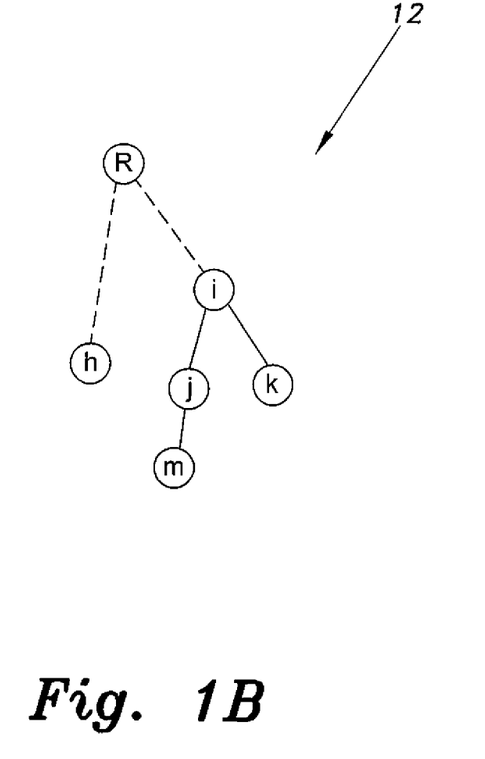
FIG. 1B is a node diagram illustrating a recovery tree in a WSAN simultaneous failures recovery method according to the present invention.

IF Rank(j) > Rank(i) + 1
{
    Rank(j) = Rank(i) + 1;
    Ranker(j) = i;
}
ELSEIF rankerID = j
    Add i to the list of nodes ranked by j;
ENDIF Since there are probably multiple paths between the root and node j, node j may receive multiple rank assignment messages from nodes other than i, but it will not update its current rank unless the above condition is satisfied. If it is not satisfied and ranker(i) is j itself, j adds the sender node i to the list of ranked nodes. For example, in exemplary network tree 10 shown in FIG. 1A, assuming rank(h)>rank(i), j is ranked by i. Node j will send a rank assignment message to its neighbours. If node i receives this message from j, node i adds j to its set of ranked nodes. Node k and node h will ignore the rank assignment message from j. Node m updates its rank and sets ranker(m)=j. A recovery tree 12 is constructed at the end of this phase, as shown in FIG. 1B. The tree is used in the recovery algorithm.

With respect to weight computation, the present method considers two types of weight to be computed, namely, clustering weight (cw) and recovery weight (rw). The clustering weight is used to decide which nodes are chosen to be cluster heads, while the recovery weight determines which nodes are to move for restoring connectivity. The clustering weight of a node v is defined as the number of its children down in the recovery tree until the next cluster. On the other hand, the recovery weight represents the fewest hops from node v to any node that has a clustering weight of zero (i.e., leaf nodes in the recovery tree).

This phase is initiated by nodes that are not nominated as rankers by any of their neighbours during the rank assignment phase. Those nodes represent leaf nodes in the recovery tree. For example, in FIGS. 1A-1B, nodes m, k, and h will start the weight computation phase.

Figure 2:
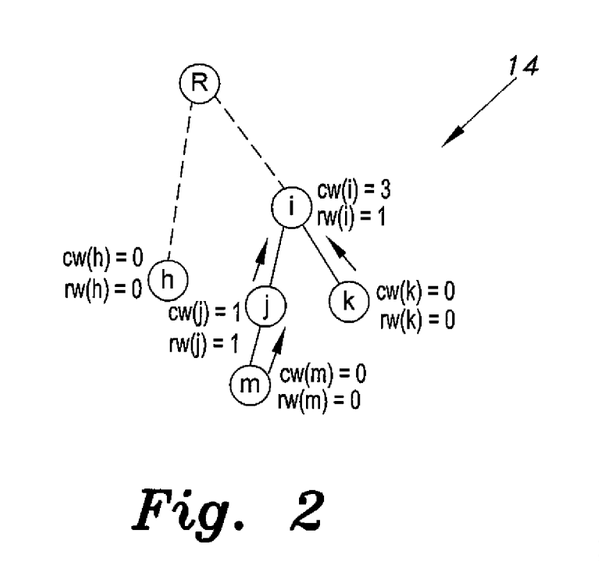
FIG. 2 is a node diagram illustrating node weight computation in a WSAN simultaneous failures recovery method according to the present invention.

All initial weights are set to zero. Each node sends the computed weight to its ranker. The message contains the sender ID and the clustering and recovery weights incremented by one, i.e., (i,cw(i)+1,rw(i)+1). The exemplary tree 14 in FIG. 2 shows k sharing its weights with its ranker i.

Node m sends a similar message to j, and j sends its own message to i. When node i receives these messages, it updates cw(i) and rw(i) as follows:

$$cw(i)=cw(i)+cw(j) \quad (1)$$

$$rw(i)=rw(j) \quad (2)$$

However, rw(i) is not updated by i unless the received recovery weight is smaller than the current recovery weight rw(i). It is obvious that the first message that is received by i (i.e., when rw(i) is zero) is an exception for this rule. After receiving the two weight messages from j and k, cw(i)=3 and rw(i)=1.

One important step in the weight computation phase is to check the clustering weight (cw) against a predefined cluster size. If that weight exceeds this value, the node identifies itself as a cluster head and sends cluster identification to its neighbors. Otherwise, it sends a compute weight message to its ranker.

Figure 3:
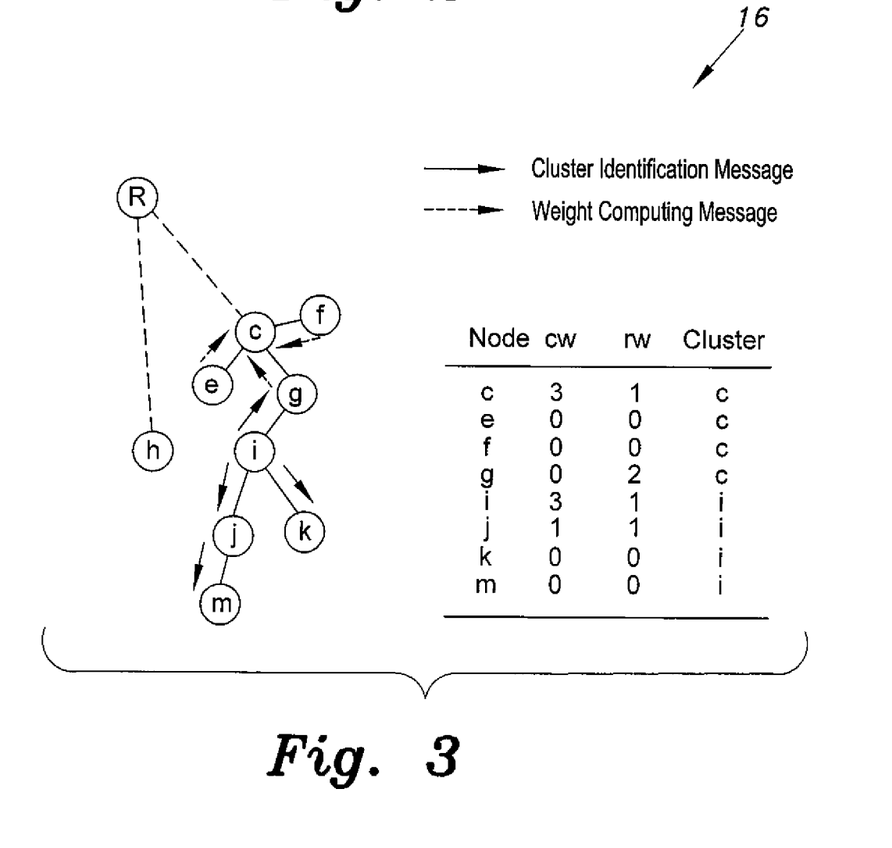
FIG. 3 is a node diagram illustrating clustering phase and weight computing results in a WSAN simultaneous failures recovery method according to the present invention.

The assumption is made in which a cluster size equals three, as shown in FIG. 2. After nodes j and k send compute weight messages to i, node i updates cw(i) to three. Since cw(i) equals the pre-defined cluster size, node i identifies itself as a cluster head and sends a cluster identification message to its neighbours. This message contains the sender ID, its cluster, cluster location, and recovery weight of that node (i,cluster(i),loc(cluster(i),rw(i)). To show how other nodes act upon receiving this message, let us assume there is a node g up in the hierarchy of the recovery tree to R, where rank(g)=rank (i)−1 and ranker(i)=g, as shown in the tree diagram and cluster table 16 of FIG. 3. The message will be received by all neighbours of i (j, k, and g). The nodes that are ranked by i (i.e. j and k) will see the message coming from their ranker, and therefore they set their cluster to i, save its location, and forward the message to their neighbours (if any). Node m will receive the message from j and do the same. Node g also will hear this message from i, but node g will act differently, since the message is coming from one of its ranked nodes. Node g updates its recovery weight rw(g) according to equation (1), sets its clustering weight cw(g) to zero, and sends a compute weight message to ranker(g)=c. When c receives the weight computing message from g, node c updates cw(c). The recovery weight rw(c) may not be updated by c, since node c achieves lower recovery weight through nodes e or f FIG. 3 shows the clustering weights, recovery weights, and cluster assignments for all nodes. To avoid confusion, a node does not send its compute message to its ranker until it computes its correct clustering weight by waiting for all children messages. For example, if node i receives a weight message from k before j, it waits until hearing from j. If for any reason, node i does not hear from j, node i can send its current weight and update its ranker g. While, if that happens, more clustering messages are needed, so that the process will yield correct clustering assignments.

Having completed successfully the above steps, the network is ready to react and invoke the recover procedure. When an actor node fails, the associated recovery tree is partitioned into several segments. The simultaneous failures recovery algorithm (SFRA) is composed of two main steps, which are recovering the failed node, and connecting the partitioned sub-network to the rest of the network. The first step is to choose a new node to be the leader node in this segment and replace the failed node. The second step is to reconnect the segment to the rest of the tree.

Let us assume that ch(F) represents the set of children nodes of the failed node F in the recovery tree, where ne(F) is the set of F's neighbors in the original WSAN. The recovery tree obtained in the rank assignment phase is used in recovery coordination. Only nodes in ch(F) are involved in the first step. Other nodes that are not ranked by F simply ignore the failure of F, so long as they are connected to their parents in the recovery tree. Therefore, if F is a leaf node in the tree (i.e., ch(F) is empty), no actions will be taken by any node, since the network is still connected. The following describes the two steps in detail.

Each node in ch(F) sends a Send Weight message containing its recovery weight and the ID of its parent F. Other nodes that are not ranked by F (not in ch(F)) will ignore this message. If a node that is ranked by F receives this message, it saves the received weight in its memory. Upon timing out, each node checks its list of received weights. If a node receives a weight that is lower than its own, it stops executing the algorithm and leaves other nodes in ch(F) with lower weight to recover. Let us assume that node A does not receive a lower weight in the first step. It sends a request to the node that has lowest weight in ch(A) to replace it and starts moving towards the position of its failed parent F until becoming r/2 away from F's position, where r is the communication range. It is proven that if all neighbours of F become at a distance ≤r/2 from F, they will be connected and the recovery process is complete. If "A" is at a location less than r/2 from F, it moves directly to the position of F.

If A reaches the location where it is r/2 from F, it sends a RequestWeight message to all of its current neighbours, requesting their weights. This step is needed so that nodes in ch(F) not hearing from each other in step #1 can communicate with each other. During its movement, if A receives a RequestWeight message from another node with a lower cost, node A will not send its own request, leaving the other node to replace F. However, if a node with lower weight than A receives the request, it sends a response with its weight to A. Then node A will stop moving after receiving such a response. If "A" does not receive any response to its RequestWeight message, it continues moving to replace F, and during its movement, if it hears a RequestWeight from another node with a lower weight, "A" continues towards F. The node that replaces the failed node F is called a Leader. After replacing F, the next step is to lead other nodes to restore the connectivity with the rest of the network.

After recovering the failed node F, the next step is to reconnect the partitioned segment to the rest of the network. Let us assume that "A" is replacing F in the previous step. Node A broadcasts a Recovered message to its neighbours. If a node B ∈ Ch(F) receives this message, node B stops (if it is still moving), sets ranker(B) to "A", and sends rw(B) to A. After receiving the response from B, node A updates ch(A). If a node C, whose rank is higher than that of "A", receives the recovered message, it sends a RecoverResponse message to "A", including its own rank, causing "A" to sets ranker(A) to C and rank(A) to rank(C)+1. If "A" receives multiple responses, it sets its ranker to the node that has the smallest rank (i.e., fewer hops to the root). If "A" does not receive any response, it assumes itself as a "lost" node, and it has to re-establish its connectivity with the rest of the network. Therefore, node "A" moves to the position of its cluster head. Let us assume that node M is the cluster head of A. Before moving to M, A does a quick look-up in its memory and sends a replacement request to the node D, whose weight is the lowest among ch(A), and then starts moving to M. Node D does the same as "A" and searches for a node with minimum weight among ch(D), and so on. This process is done recursively until a replacement request reaches a node without any children in the recovery tree.

During its movement towards M, node A looks for a node with a higher rank and establishes connectivity with it. If "A" does not find such a node, it should connect with M if it does not move from its location. If M fails or moves to another location and "A" can no longer know how to reach it and has to move towards the root of the topology, it also checks during its movement for a node with a higher rank. When "A" finds a higher rank node, it stops moving and sends StopRequest to node D. When D receives the stopping request, it also sends it to its following node. This is done reclusively until all nodes of ch(A) stop moving.

When the recovery operation is completed and the network connection is restored, the node rank assignment needs to be updated, since node locations have changed. The update can be done only among the nodes that have changed their locations in order to lower the overhead of the update, especially for large networks.

Figure 4A:
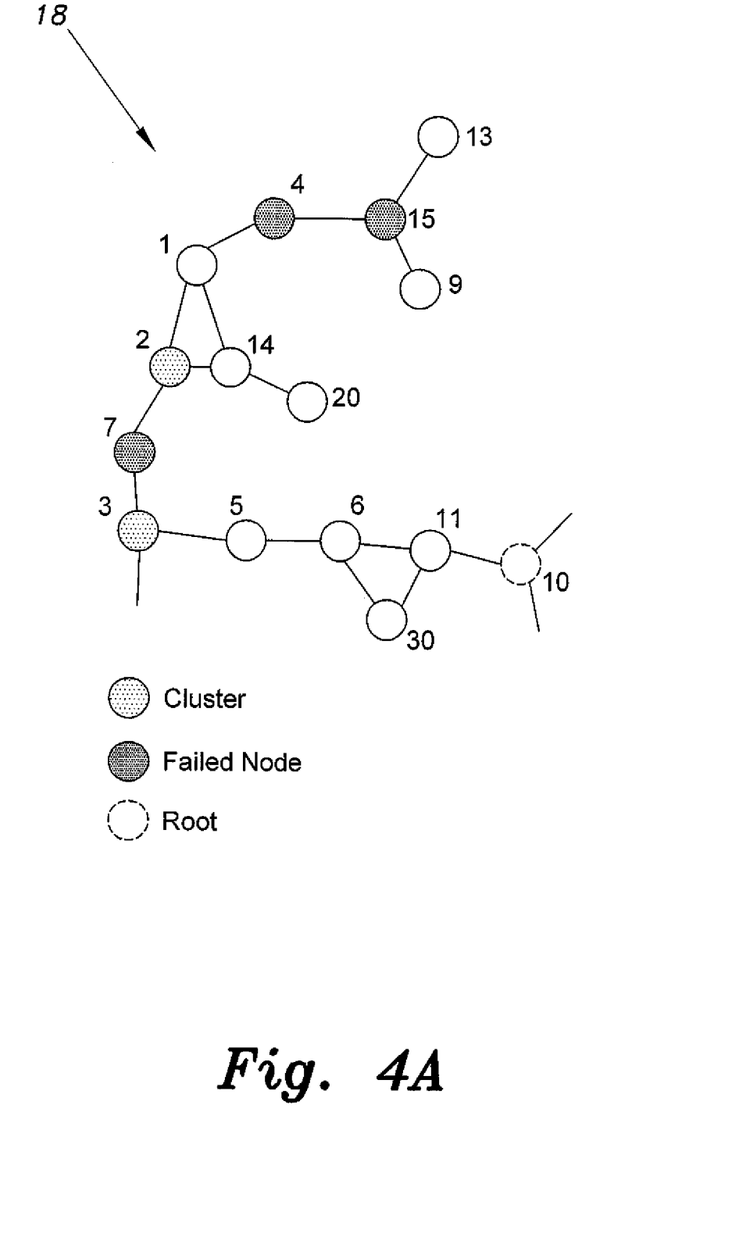
FIG. 4A is a node diagram illustrating failed nodes in a WSAN simultaneous failures recovery method according to the present invention.
Figure 4B:
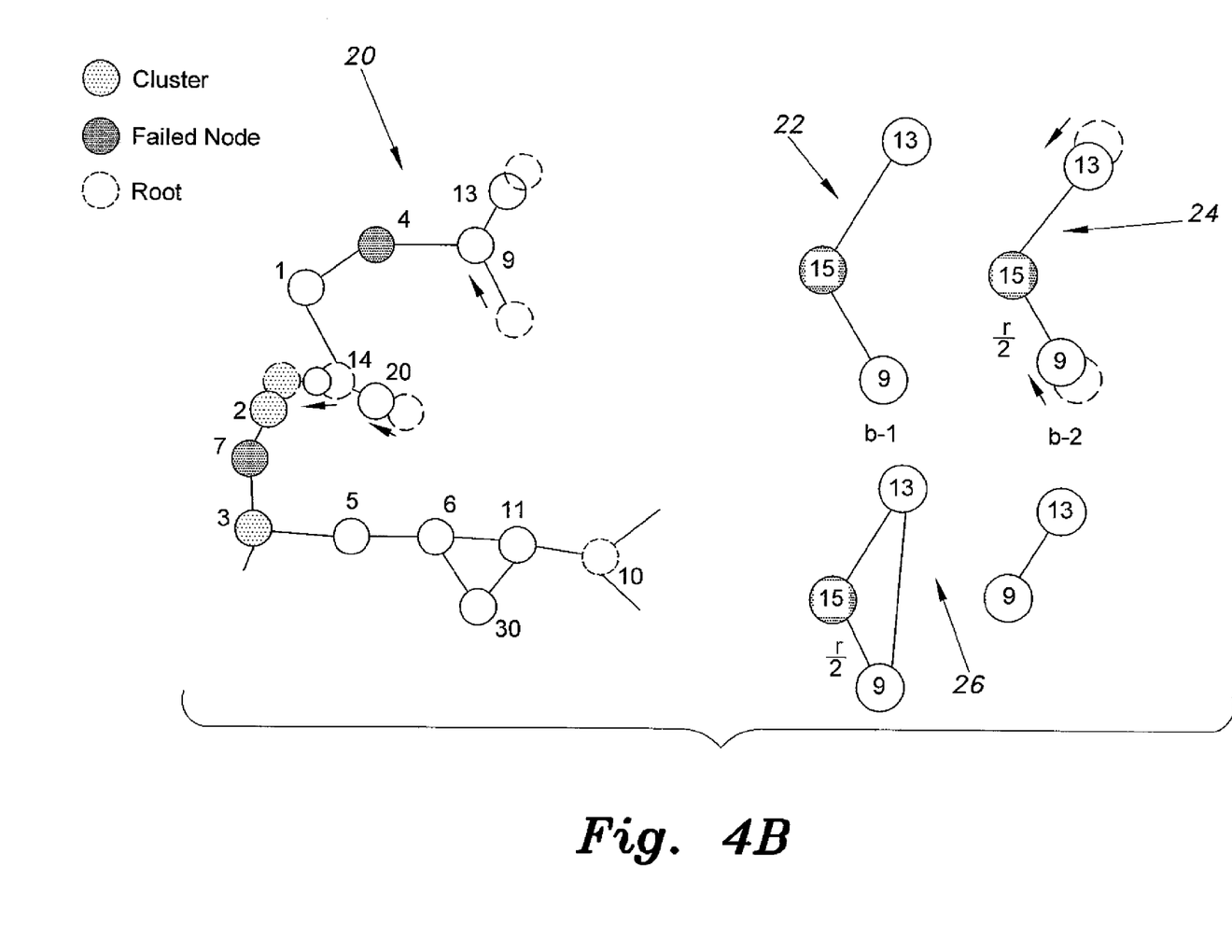
FIG. 4B is a node diagram illustrating initial node movement during a failures recovery phase in a WSAN simultaneous failures recovery method according to the present invention.
Figure 4C:
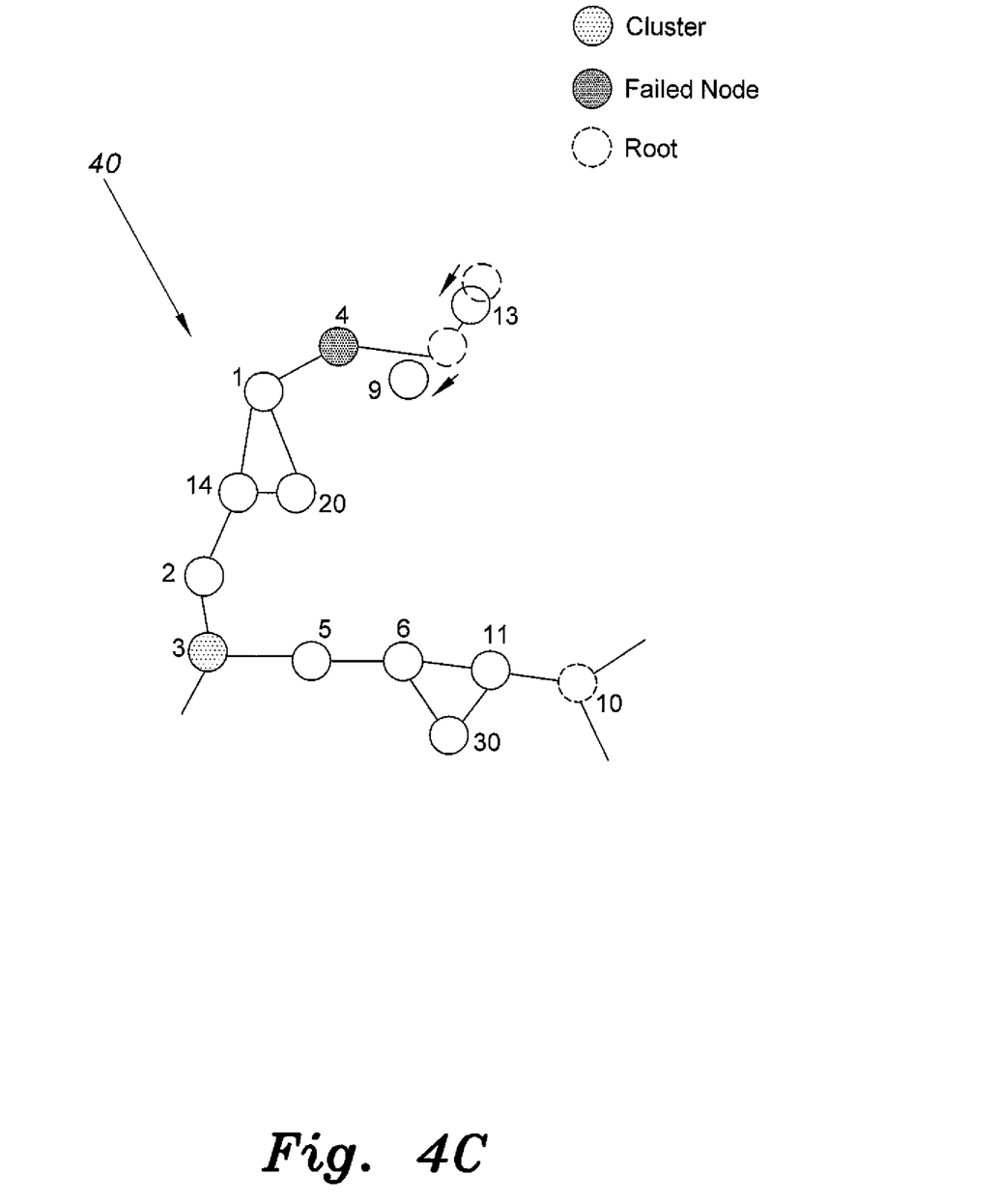
FIG. 4C is a node diagram illustrating intermediate node movement during a failures recovery phase in a WSAN simultaneous failures recovery method according to the present invention.

Tree 18 of FIG. 4A shows a part of a topology that has 40 nodes. In this example, we assume that nodes 4, 15, and 7 fail. Although all neighbours of the failed nodes will detect their failures, only nodes that are in their children sets are responsible for recovery. For example, the failure of node 7 is detected by both nodes 3 and 2. However, node 3 will simply ignore the failure, since it is not in the ch(7) set. The first step in the recovery process is to replace each failed node with the child that has the smallest weight. To accomplish that goal, node 9, 13, and 2 send a Send Weight request and wait. If they receive a similar request with smaller weight, they will stop leaving other nodes to participate in the recovery process. However, since node 2 is the only node in ch(7), it starts moving to recover the failure of 7. Before node 2 moves, it sends a ReplaceMe request to the node with the smallest weight among the nodes in ch(2), which is node 14, in our example. In response, node 14 moves and requests node 20 to replace it (FIG. 4-B 20, 22, 24, 26). When node 2 reaches the position that is r/2 to node 7, it sends a RequestWeight request to reach other possible nodes that are in ch(7) and were not heard by node 2 in its original location. Node 2 will continue moving to the position of F when it does not hear any other nodes.

Node 15 has two children, 13 and 9, which are not connected to each other. Therefore, when they first detect the failure and send SendWeight requests, they would not hear each other. Both nodes will move first to the position where they are r/2 from the position of the failed node 15. We assume that node 9 is closer to 15 and reaches that position first. It sends RequestWeight and waits. When node 13 receives the request, it compares the received weight with its own weight and send another request if it has a lower weight. Since node 13 has the same weight (a weight of one), it will not send any response, letting node 9 handle the recovery (shown in FIG. 4B).

Figure 4D:
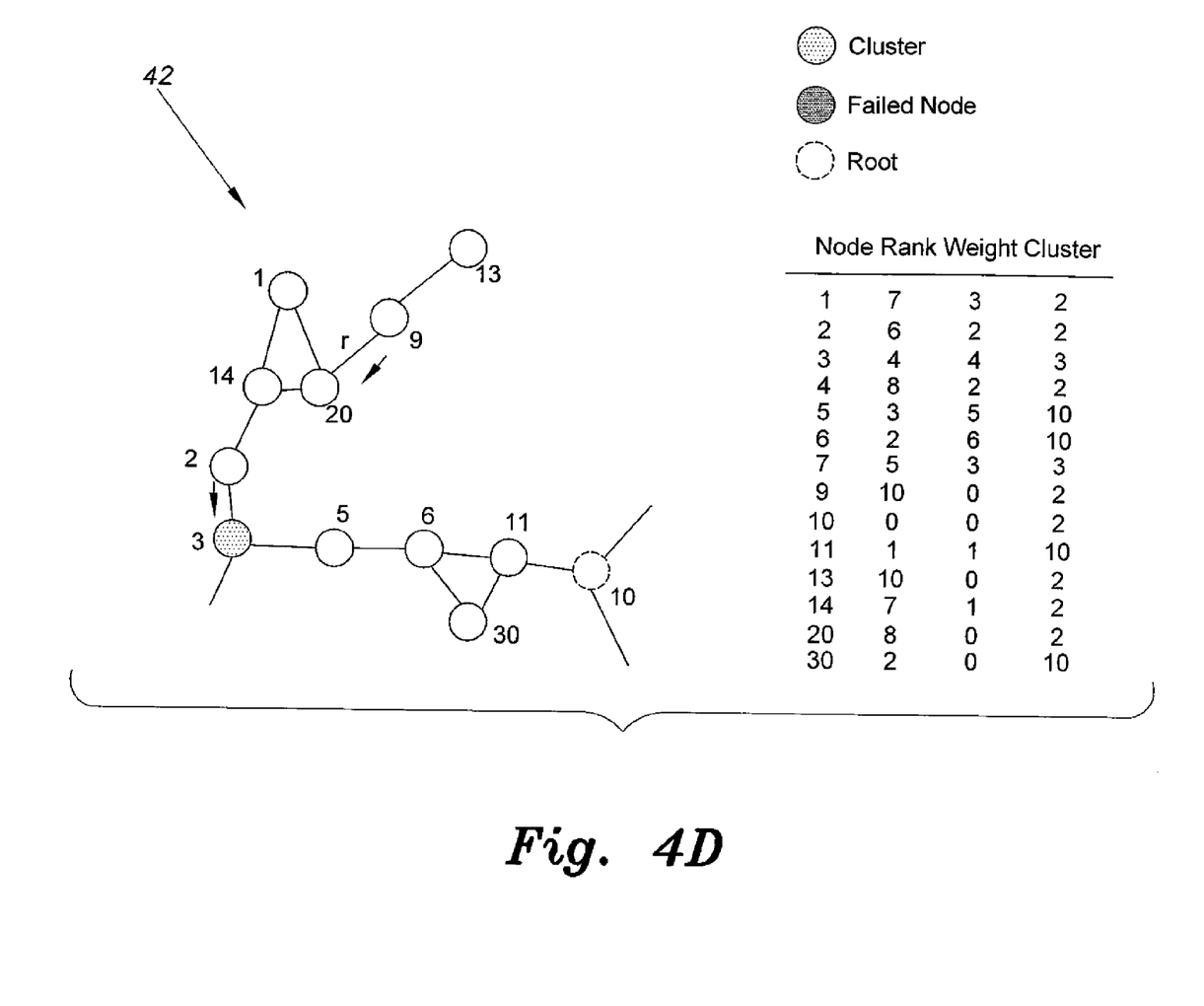
FIG. 4D is a node diagram illustrating final node position during a failures recovery phase in a WSAN simultaneous failures recovery method according to the present invention.

After node 9 reaches the position of node 15, it sends a Recovered message informing other possible nodes in ch(15). When node 13 receives that message, node 13 changes its ranker to node 9. If a node that has a higher rank receives the recovered message, it sends a ResponseRecovered message, allowing the sender node (i.e., node 9) to join its children and connect to the network. In this example, there is no such node with a higher rank, since the parent of node 15 (node 14) has failed. After a certain waiting time, node 9 starts moving to the position of the head of its cluster (node 2) hoping to find some nodes along the way or ultimately connect to node 2. It also sends a ReplaceMe message to node 13. Before reaching the position of node 2, node 9 establishes a connection with node 20 and sends a StopRequest message to node 13. The tree and table 42 of FIG. 4D shows the final network topology after all recovery operations end. The network now needs to be updated for the latest rank information. Since node 9 and node 2 have changed their position, they will send an update request to the root of the network. Other moving nodes 13, 14, and 20 will not send such an update request because they are connected to nodes with higher ranks. When node 20 receives a request sent by node 9, it will ignore it in order to prevent duplicated update requests. When the root (node 10) receives the update request from node 11, it sends a RankAssignment message only to the requested node (node 11). The rationale of this is to limit the extent of the rank update based on the scope of the failure in order to lower the messaging overhead cost.

The present method was validated in a simulated environment developed in C. Nodes are deployed in an area of 1000 x1000 m. The communication range is set to 100 m. We have simulated networks with various sizes (20, 40, 60, 80, and 100 actors). We use a uniform random probability of failure (PF) to pick the failed nodes among the cut-vertices. For each network size, we compute the average number of failed nodes based on that probability. Non cut-vertices are leaf nodes in the recovery tree and do not partition the network if they fail.

Figure 5:
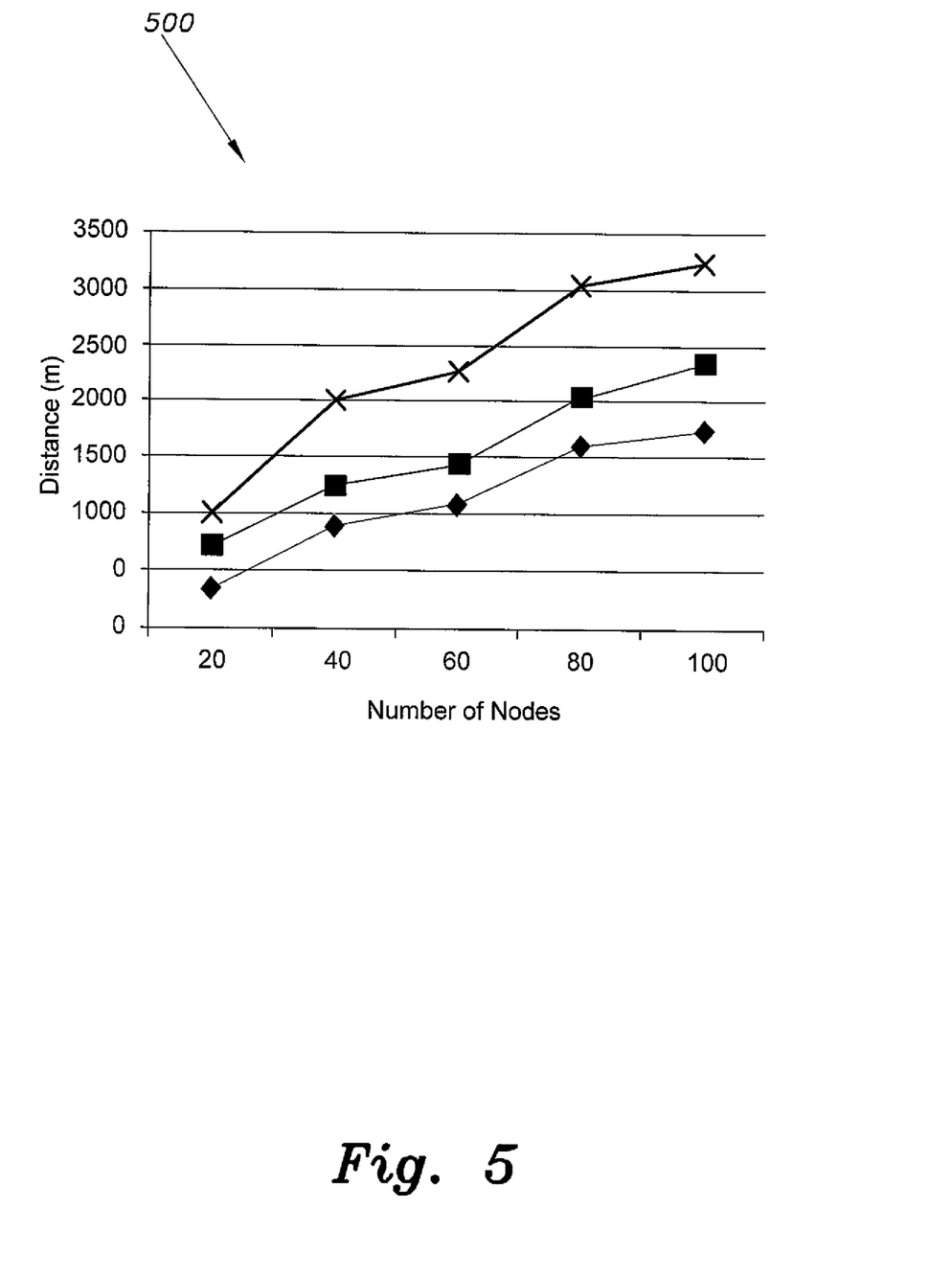
FIG. 5 is a plot showing total traveled distance for different failure probabilities in a WSAN simultaneous failures recovery method according to the present invention.

Plot 500 of FIG. 5 shows the total traveled distance cost of the present method for different probabilities of failure for each multiple network size. The plot shows that for a certain network size, the recovery cost grows when with the increase in the failed node count (higher PF). Having many failed nodes in the recovery tree means more children to move, and therefore a longer distance to be traveled. For a fixed probability of failure, the cost of recovery increases when the network size (number of nodes) increases. This is because the increased node count implies the involvement of more nodes in the recovery, and thus the total distance and the average distance grow.

Testing demonstrated that for networks with 40 and 60 nodes, the recovery cost grows slightly when the cluster size increases. This is very much intuitive, since the relocating nodes have to travel further to the position of their cluster heads, when deemed necessary. However, for a network of 100 nodes, clustering does not show significant improvement, since the number of healthy nodes is large, and many leader nodes can be identified to replace their parents without the need to reach the cluster heads. This result shows that clustering always improves the performance, compared to the case of letting leader nodes go to the root directly (cluster size equals one). In addition, using a smaller cluster size achieves a slightly fewer number of communication messages during weight computing and clustering phases. Non-cluster nodes will send three different messages, including rank assignment, weight computing, and clustering messages. Cluster nodes will send only rank assignment and clustering messages. Increasing the cluster size will increase non-cluster nodes and decreases cluster count for the same network size, which leads to slightly more communication messages. Table 2 shows that there is about a 4.5% increase in the number of sent messages when the cluster size is increased from 5 to 15. The percentage of increase stays almost unchanged for different network sizes.

TABLE 2

Number of sent messages during rank, weight computing, and clustering phases

| # nodes | Cluster size = 5 | Cluster size = 15 | % increase |
| --- | --- | --- | --- |
| 40 | 4647 | 4853 | %4.43 |
| 60 | 7847 | 8201 | %4.51 |
| 100 | 1602 | 1674 | %4.49 |

It is to be understood that the present invention is not limited to the embodiments described above, but encompasses any and all embodiments within the scope of the following claims.

We claim:
1. In a wireless sensor-actor network (WSAN) having a topology defined by a plurality of connected sensor nodes and actor nodes, a computer- implemented WSAN simultaneous failures recovery method, comprising the steps of:
   searching the plurality of connected sensor nodes and actor nodes in a breadth first search (BFS) manner, starting at a root node;
   assigning a rank to the plurality of connected sensor nodes and actor nodes during the BFS of the plurality of connected sensor nodes and actor nodes, wherein the rank of each of the plurality of connected sensor nodes and actor nodes is determined by a number of shortest hops to the root node of the wireless sensor-actor network;
   creating a recovery tree based on the rank assigned to the plurality of connected sensor nodes and actor nodes, the recovery tree having parent nodes;
   defining roles of the plurality of connected sensor nodes and actor nodes based on levels of the plurality of connected sensor nodes and actor nodes in the recovery tree;
   assigning a clustering weight and a recovery weight to each of the plurality of connected sensor nodes and actor nodes, the recovery weight being based on a number of hops to a particular one of the plurality of connected sensor nodes and actor node's closest leaf node in the recovery tree, the recovery weight being used to determine how the plurality of connected sensor nodes and actor nodes are to move to restore connectivity, the clustering weight being based on the number of children nodes down in the recovery tree until a cluster is encountered, the clustering weight being used to determine which of the plurality of connected sensor nodes and actor nodes will form a new cluster head;
   each of the plurality of connected sensor nodes and actor nodes checking its clustering weight against a predefined cluster size and when its clustering weight exceeds the predefined cluster size establishing itself as a cluster head and sending cluster identification to the cluster head's neighbor nodes;
   monitoring the network for the occurrence of a node failure;
   upon determination of a failed node, each of the plurality of connected sensor nodes and actor nodes in a set of children nodes of the failed node in the recovery tree recursively transmitting its assigned recovery weight and an ID of its parent to other ones of the plurality of connected sensor nodes and actor nodes in the set of children nodes of the failed node and saving received assigned recovery weights and IDs from the other ones of the plurality of connected sensor nodes and actor nodes in the set of children nodes of the failed node, each of the plurality of connected sensor nodes and actor nodes in the set of children nodes of the failed node ceasing transmission of its assigned recovery weight and saving of received assigned recovery weights when a received assigned recovery weight is lower than its own assigned recovery weight, thereby leaving the other children nodes of the failed node with lower weight to recover;
   moving each of the plurality of connected sensor nodes and actor nodes to positions having ranks that are at most half of the rank of the failed nodes away from the failed node, one of the plurality of connected sensor nodes and actor nodes becoming a recovering node taking the place of the failed node in the recovery tree.

2. The WSAN simultaneous failures recovery method according to claim 1, further comprising the steps of:
  said recovering node broadcasting a recovered message to its neighbor nodes;
  any of the neighbor nodes moving towards said failed node's location ceasing movement towards said failed node's location upon receiving the recovered message;
  transmitting a response from said neighbor nodes to said recovering node;
  said recovering node updating its list of children nodes upon receiving the neighbor nodes' responses;
  said recovering node allowing a responding one of said neighbor nodes to rank said recovering node if said responding one of said neighbor nodes has the highest rank among said neighbor nodes having a higher rank than the rank of said recovering node;
  said recovering node assuming the role of lost node if said recovering node does not receive a response to said recovered message broadcast, wherein said lost node sends a replacement request message to a selected one of said nodes whose weight is the lowest among the children of said lost node, said lost node then initiating movement towards a position of its cluster head, said lost node then resuming as the recovering node until the replacement request reaches a node without any children in the recovery tree.

3. The WSAN simultaneous failures recovery method according to claim 1, further comprising the steps of:
  said recovering node broadcasting a recovered message to its neighbor nodes;
  any of said neighbor nodes moving towards said failed node's location ceasing movement towards said failed node's location upon receiving the recovered message;
  transmitting a response from said neighbor nodes to said recovering node;
  said recovering node updating its list of children nodes upon receiving the neighbor nodes' responses;
  said recovering node allowing a responding one of said neighbor nodes to rank said recovering node if said responding one of said neighbor nodes has the highest rank among said neighbor nodes having a higher rank than the rank of said recovering node;
  said recovering node assuming the role of lost node if said recovering node does not receive a response to said recovered message broadcast, said lost node searching for a node with a higher rank;
  if said lost node finds a node with a higher rank, then said lost node establishing connectivity with said node having the higher rank;
  said lost node attempting connectivity with said cluster head if said lost node search did not find a node with a higher rank;
  said lost node moving towards said root node of said network if said lost node fails to connect with said cluster head;
  said lost node reattempting said search and connectivity with a node having a higher rank than said lost node;
  said lost node stopping its movement and sending a stop request to a selected one of said nodes whose weight is the lowest among the children of said lost node, said lost node then resuming as the recovering node until the children nodes of said lost node have stopped moving.

* * * * *